(12) United States Patent
Gundavelli et al.

(10) Patent No.: US 12,341,900 B2
(45) Date of Patent: Jun. 24, 2025

(54) CRYPTOGRAPHICALLY GENERATED DEVICE IDENTIFIERS

(71) Applicant: Cisco Technology, Inc., San Jose, CA (US)

(72) Inventors: Srinath Gundavelli, San Jose, CA (US); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 18/149,491

(22) Filed: Jan. 3, 2023

(65) Prior Publication Data
US 2024/0015025 A1    Jan. 11, 2024

Related U.S. Application Data

(60) Provisional application No. 63/368,032, filed on Jul. 8, 2022.

(51) Int. Cl.
*H04L 9/32*    (2006.01)
*H04L 9/30*    (2006.01)
*H04W 12/08*   (2021.01)

(52) U.S. Cl.
CPC .............. *H04L 9/3242* (2013.01); *H04L 9/30* (2013.01); *H04W 12/08* (2013.01)

(58) Field of Classification Search
CPC ......... H04L 9/3242; H04L 9/30; H04W 12/08
USPC .......................................................... 713/153
See application file for complete search history.

(56) References Cited

U.S. PATENT DOCUMENTS

| | | | |
|---|---|---|---|
| 2006/0212928 A1 | 9/2006 | Maino et al. | |
| 2015/0295930 A1 | 10/2015 | Dixon et al. | |
| 2016/0183243 A1* | 6/2016 | Park | H04W 52/0241 370/329 |
| 2017/0302656 A1 | 10/2017 | Ramatchandirane | |
| 2018/0013568 A1 | 1/2018 | Muhanna et al. | |
| 2020/0067922 A1 | 2/2020 | Avetisov et al. | |
| 2023/0098093 A1* | 3/2023 | Hawkes | H04W 12/06 370/338 |
| 2024/0146728 A1* | 5/2024 | Chen | H04L 63/0876 |

* cited by examiner

*Primary Examiner* — Aftab N. Khan
(74) *Attorney, Agent, or Firm* — Patterson + Sheridan, LLP

(57) ABSTRACT

Techniques for network communications are disclosed. These techniques include receiving a cryptographically generated device identifier (CGDI) and a public key relating to a wireless station (STA). The techniques further include determining a first hash based on decrypting the CGDI using the public key, and validating the first hash for an access network. The techniques further include identifying the STA in the access network using the CGDI based on binding the CGDI to a session associated with the STA and the access network.

17 Claims, 6 Drawing Sheets

CRYPTOGRAPHICALLY GENERATED DEVICE IDENTIFIERS

CROSS-REFERENCE TO RELATED APPLICATIONS

This application claims benefit of U.S. provisional patent application Ser. No. 63/368,032 filed Jul. 8, 2022. The aforementioned related patent application is herein incorporated by reference in its entirety.

TECHNICAL FIELD

Embodiments presented in this disclosure generally relate to network communications. More specifically, embodiments disclosed herein relate to cryptographically generated device identifiers.

BACKGROUND

In existing systems, link-layer identifiers (e.g., IEEE 48-bit media access control (MAC) address) on the WiFi interface, and international mobile equipment identity (IMEI) or permanent equipment identifiers (PEI) on the cellular interface, have served as stable device identifiers. An access network is able to identify the device and correlate all the sessions initiated from that device irrespective of the identity that is used for access authentication. The network can apply a consistent security policy on all the sessions associated with that device based on that one common and stable device identifier.

These existing identifiers, however, raise potential privacy concerns because they can potentially be used to identify devices across access network. With increased focus on privacy, these identifiers may no longer be suitable as stable device identifiers. Further, with support for MAC address rotation, there may be no stable MAC address to use as an identifier (e.g., for WiFi). One more techniques are needed for a device to assert its ownership of a given device identity, and for an access network to validate the identity.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
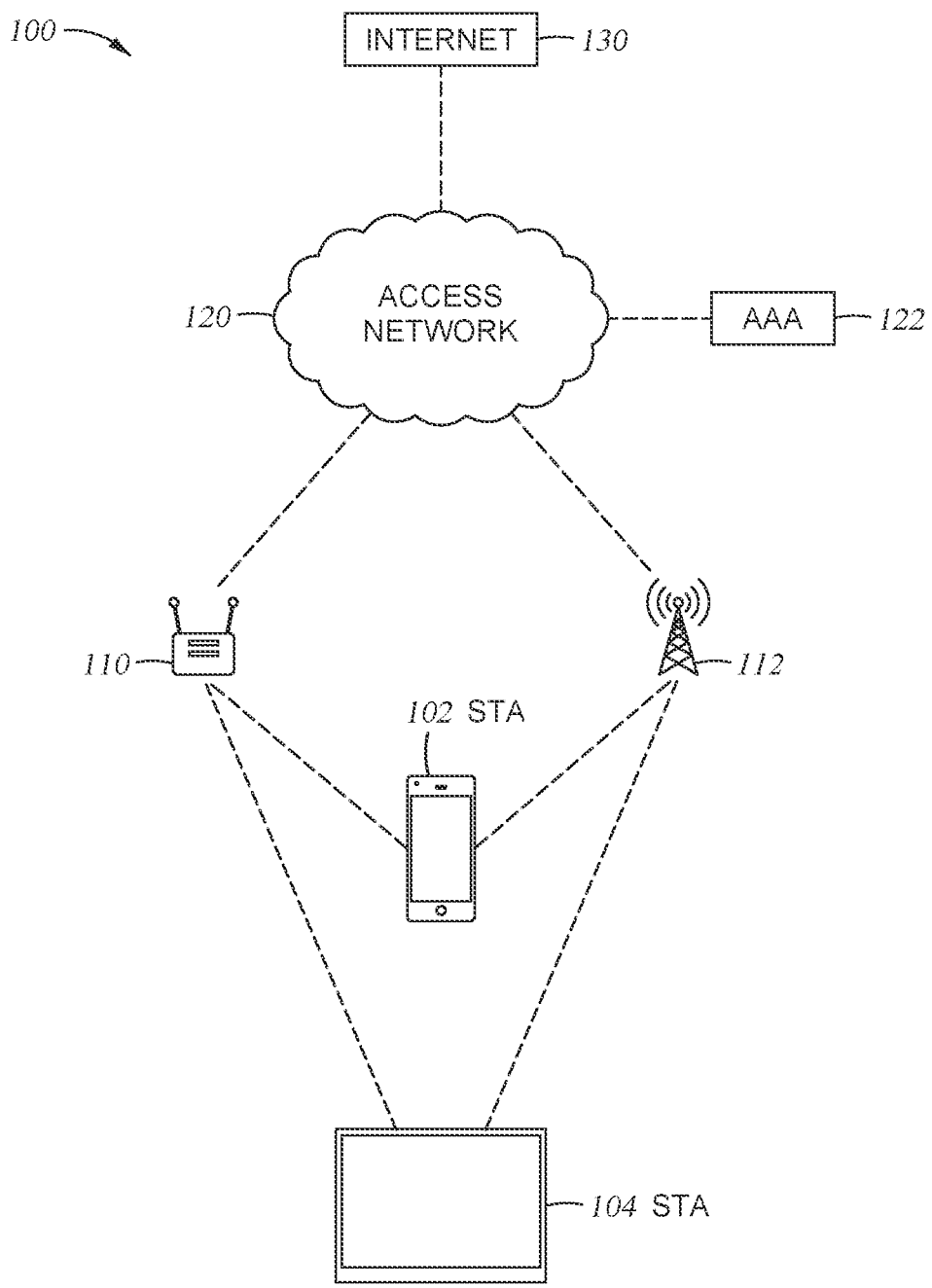
FIG. 1A illustrates a computing environment for cryptographically generated device identifiers, according to one embodiment.

Embodiments include a method. The method includes receiving a cryptographically generated device identifier (CGDI) and a public key relating to a wireless station (STA). The method further includes determining a first hash based on decrypting the CGDI using the public key. The method further includes validating the first hash for an access network. The method further includes identifying the STA in the access network using the CGDI based on binding the CGDI to a session associated with the STA and the access network.

Embodiments further include a system. The system includes a processor and a memory having instructions stored thereon which, when executed on the processor, performs operations. The operations include receiving a CGDI and a public key relating to an STA. The operations further include determining a first hash based on decrypting the CGDI using the public key. The operations further include validating the first hash for an access network. The operations further include identifying the STA in the access network using the CGDI based on binding the CGDI to a session associated with the STA and the access network.

Embodiments further include a non-transitory computer-readable medium having instructions stored thereon which, when executed by a processor, performs operations. The operations include receiving a CGDI and a public key relating to an STA. The operations further include determining a first hash based on decrypting the CGDI using the public key. The operations further include validating the first hash for an access network. The operations further include identifying the STA in the access network using the CGDI based on binding the CGDI to a session associated with the STA and the access network.

Example Embodiments

In an embodiment, a Network Access Identifier (NAI) is an identifier used by access networks for identifying users requesting access to the network. A user may access the network using more than one device, but all using the same NAI and the associated credentials. There are various use cases, however, where an access network needs to unambiguously identify a device used for accessing the network. An NAI is not sufficient for this determination. A unique identity for the device which is common across all the supported access interfaces allows the network to unambiguously identify the device.

As discussed above, currently available stable identifiers such as a MAC address, IMEI, or serial number as the unique device identifier is no longer an option for privacy reasons. Furthermore, with support for MAC rotation, there is no stable MAC address on the endpoint devices.

In an embodiment, device identifiers can be generated using cryptographic techniques. The generated identifiers have one or more of several properties: a) the device identifier binds to a given access network and is unique for that network, b) the device identifier is unique to the device that has the ability to assert ownership over the identifier, c) the device identifier is immutable within a given network, and d) the device identifier is access-agnostic and can be signaled over any radio access technologies supported in the given access network.

In an embodiment, one or more of these properties can be achieved by generating a device identifier cryptographically. For example, the identifier can be generated by encrypting a hash of a public key for the device, an access network identifier, and one or more auxiliary parameters. The generated identifier is referred to Cryptographically Generated Device Identifiers (CGDI). The public key of the device owner is bound cryptographically to the identifier, and the CGDI uniquely identifies the device for a given access network. This is discussed further, below, with regard to FIGS. 3-6.

FIG. 1A illustrates a computing environment 100 for cryptographically generated device identifiers, according to one embodiment. In an embodiment, a device identifier (e.g., a CGDI) should unambiguously identify a device for an access network. For example, STAs 102 and 104 are each dual radio devices capable of connecting to a WiFi network 110 and a cellular network 112. The WiFi network 110 and cellular network 112 are associated with an access network 120, which includes an authentication, authorization, and accounting (AAA) function 122 and provides access to the Internet 130.

The STAs 102 and 104 can be any suitable wireless devices (e.g., an Internet of Things (IoT) device, smartphone, tablet, laptop computer, wearable device, or any other suitable wireless device). Further, the STAs 102 and 104 can include any suitable number of wireless antennas used for any suitable radio access technologies (e.g., multiple antennas used for WiFi and cellular connectivity).

As illustrated, multiple levels of identifier ambiguity are possible for the STAs 102 and 104. For example, both the STA 102 and the STA 104 are connected to the WiFi network 110 and the cellular network 112. An identifier must unambiguously identify the STA 102 and the STA 104 for each of these networks. Further, the STA 102 and the STA 104 are each connected to both the WiFi network 110 and the cellular network 112. An identifier must also unambiguously identify the devices for each of these networks. As discussed further below with regard to FIGS. 3-6, a CGDI meets each of these requirements.

Figure 1B:
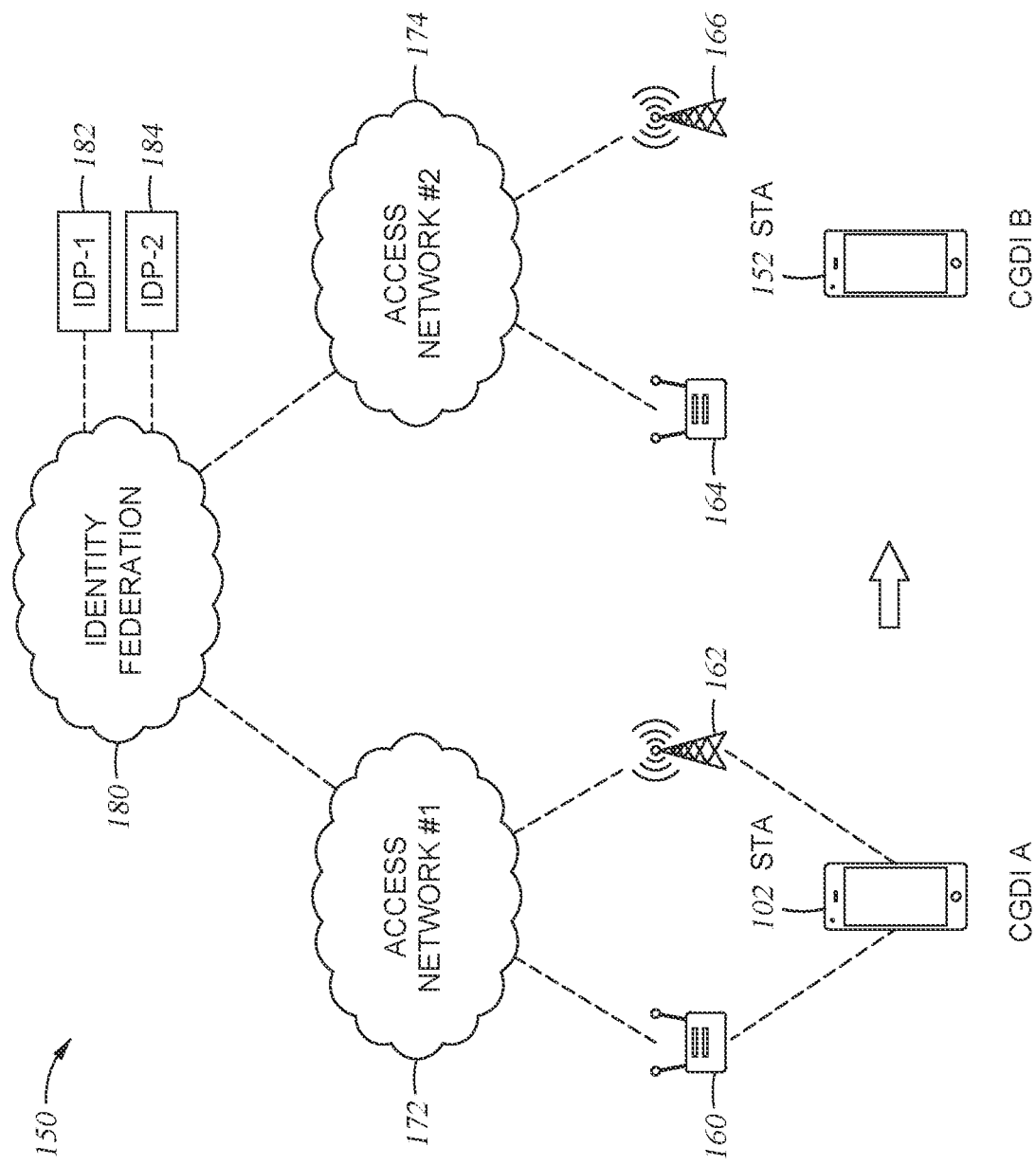
FIG. 1B illustrates a further computing environment for cryptographically generated device identifiers, according to one embodiment.

FIG. 1B illustrates a further computing environment 150 for cryptographically generated device identifiers, according to one embodiment. In an embodiment, a CGDI should also avoid exposing personally identifiable information (PII) relating to a device. In an embodiment, this means that a CGDI should not be traceable across access networks, and a CGDI exposed to one access network should be different from any other access network.

An STA 152 is initially associated with a WiFi network 160 and a cellular network 162, which are both associated with a first access network 172. The STA 152 later moves to be associated with a WiFi network 164 and a cellular network 166, which are both associated with a second access network 174. In an embodiment, the STA 152 should use a different identifier with each of the access networks 172 and 174. For example, the STA 152 can use CGDI A with the first access network 172, and CGDI B with the second access network 174. As discussed further, below, with regard to FIGS. 3-6 the CGDIs A and B provide for different identifiers for different access networks.

The STA 152 can be any suitable wireless devices (e.g., an Internet of Things (IoT) device, smartphone, tablet, laptop computer, wearable device, or any other suitable wireless device). Further, the STA 152 can include any suitable number of wireless antennas used for any suitable radio access technologies (e.g., multiple antennas used for WiFi and cellular connectivity). In an embodiment, each of the access networks 172 and 174 can be associated with an identity federation 180 (e.g., an OpenRoaming™ Federation) and identity providers (IDPs) 182 and 184. For example, an STA can be associated with a roaming consortium identifier (RCOI) relating to the identity federation 180. The RCOI can be provisioned on a passport profile for the STA, and the STA can select an access network based on the RCOI. Thus, a given access network can be associated to an RCOI, or another identity federation identifier, for an STA.

Figure 2:
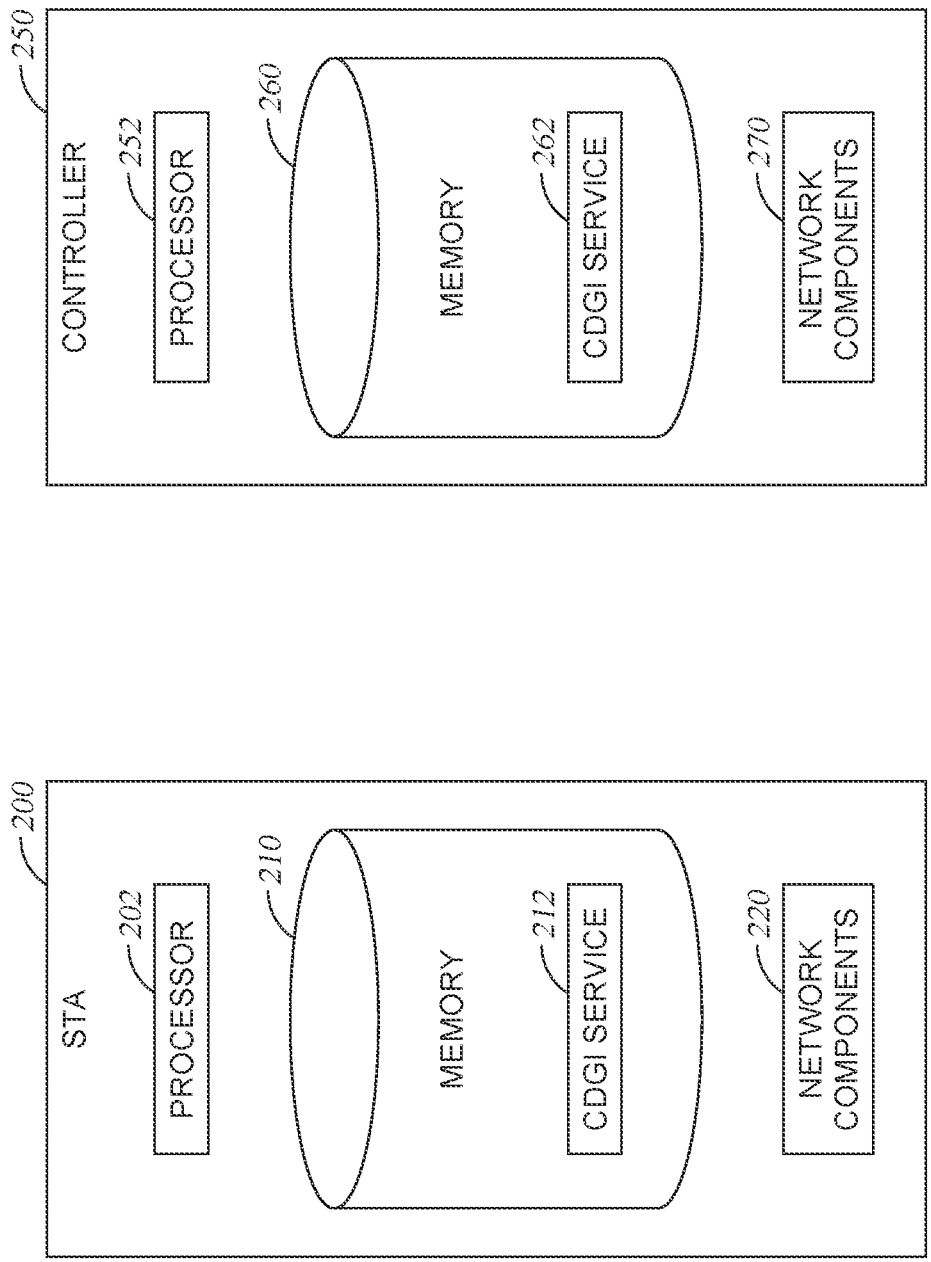
FIG. 2 illustrates a wireless station (STA) and controller for cryptographically generated device identifiers, according to one embodiment.

FIG. 2 illustrates an STA 200 and controller 250 for cryptographically generated device identifiers, according to one embodiment. In an embodiment, the STA 200 corresponds with any of the STAs 102, 104, or 152 illustrated in FIGS. 1A-B. The STA 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the STA 200 to interface with one or more wireless communication networks, as discussed above in relation to FIG. 1. For example, the network components 220 can include WiFi or cellular network interface components and associated software.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the STA 200. The program code is generally described as various functional "applications" or "modules" within the memory 210, although alternate implementations may have different functions and/or combinations of functions. Within the memory 210, a CGDI service 212 facilitates generating a CGDI for the STA, as discussed below in relation to FIGS. 3-6.

The controller 250 includes a processor 252, a memory 260, and network components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

The network components 270 include the components necessary for the controller 250 to interface with a wireless communication network, as discussed above in relation to FIG. 1. For example, the network components 270 can include WiFi or cellular network interface components and associated software.

Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory. The memory 260 generally includes program code for performing various functions related to use of the controller 250. The program code is generally described as various functional "applications" or "modules" within the memory 260, although alternate implementations may have different functions and/or combinations of functions. Within the memory 260, a CGDI service 262 facilitates using CGDIs to identify STAs, as discussed below in relation to FIGS. 3-6

Figure 3:
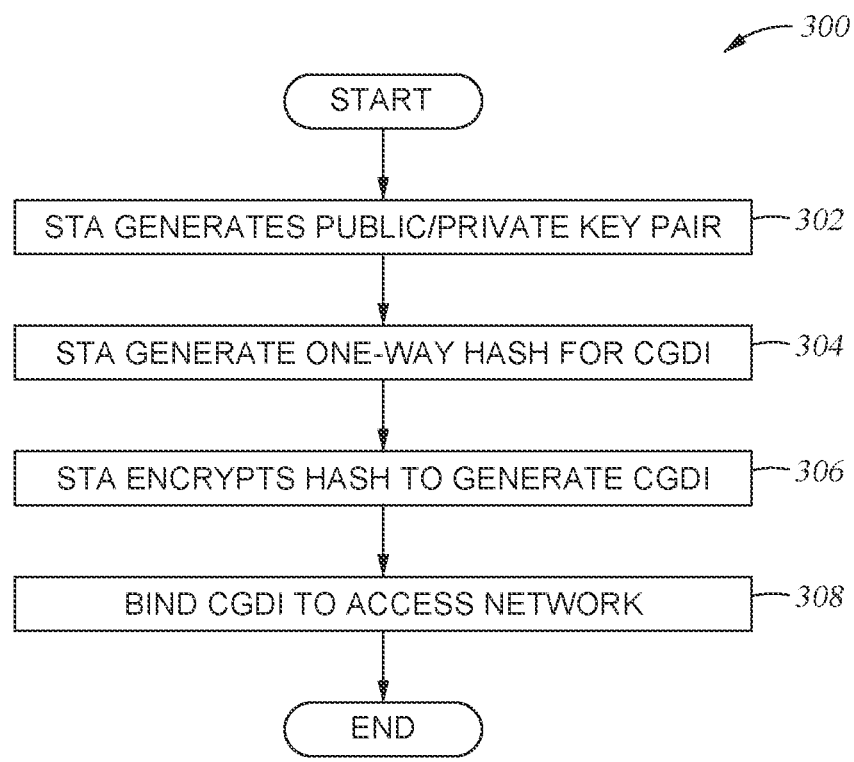
FIG. 3 is a flowchart illustrating cryptographically generated device identifiers, according to one embodiment.

FIG. 3 is a flowchart 300 illustrating cryptographically generated device identifiers, according to one embodiment. At block 302, a CGDI service (e.g., the CGDI service 212 illustrated in FIG. 2) at an STA generates a public/private key pair for the CGDI operation. For example, the CGDI generates a Rivest-Shamir-Adleman (RSA) public/private key pair for use with generating CGDIs.

As illustrated, the CGDI service at the STA generates the public/private key pair for the CGDI operation. But this is merely one example. The key pair can be provided from any suitable source. For example, the STA can obtain the public/private key pair from a network component. During a device on-boarding, as one example, a network component (e.g., a controller, a AAA function, or any other suitable network component) could generate the public/private key pair and configure the STA with these keys.

At block 304, the CGDI service at the STA generates a one-way hash for the CGDI. In an embodiment, the one-way hash is tied to the access network with which the CGDI will be used. For example, the one-way hash can take as input: (i) an access network identifier, (ii) the public key generated at block 302, and (iii) any additional auxiliary parameters.

In an embodiment, the access network identifier is a private enterprise identifier, a public land mobile network (PLMN) identifier, a network identifier (NID), a network access identifier (NAI) realm (e.g., xxx.mnc[MNC].mcc[MCC].3gppnetwork.org), a service set identifier (SSID), a roaming consortium identifier (RCOI), or any other suitable identifier. These are merely examples, and any suitable access network identifier can be used. Further, in an embodiment, the auxiliary parameters can include elements from the authentication procedure. This can include an NAI, a key (e.g., a key generated during network onboarding for the STA), or any other suitable parameter.

At block 306, the CGDI service at the STA encrypts the one-way hash to generate the CGDI. In an embodiment, the CGDI service encrypts the one-way hash using the private key generated at block 302. For example, the CGDI service can generate a 64-bit identifier which can be used as a CGDI for the access network used to generate the hash.

At block 308, the CGDI service binds the CGDI to the access network. In an embodiment, the CGDI can be used within an access network when connected over any of the radio access technologies supported for that network. The generated identifier is bound to the access network whose identity is used in the CGDI generation. For example, the CGDI can be bound to the access network using a AAA function (e.g., the AAA 122 illustrated in FIG. 1A). This is merely an example. In an embodiment, an enterprise user with multiple devices will generate a unique CGDI for each device and on an access network basis.

Furthermore, while FIG. 3 focuses on the STA generating the CGDI, this is merely an example. Alternatively, or in addition, a network (e.g., the access network 120 illustrated in FIG. 1A), policy function (e.g., the AAA 122 illustrated in FIG. 1A) or IDP (e.g., the IDPs 182 and 184 illustrated in FIG. 1B) can also generate the device identifier and provision the corresponding private/public key parameters on the STA.

Figure 4:
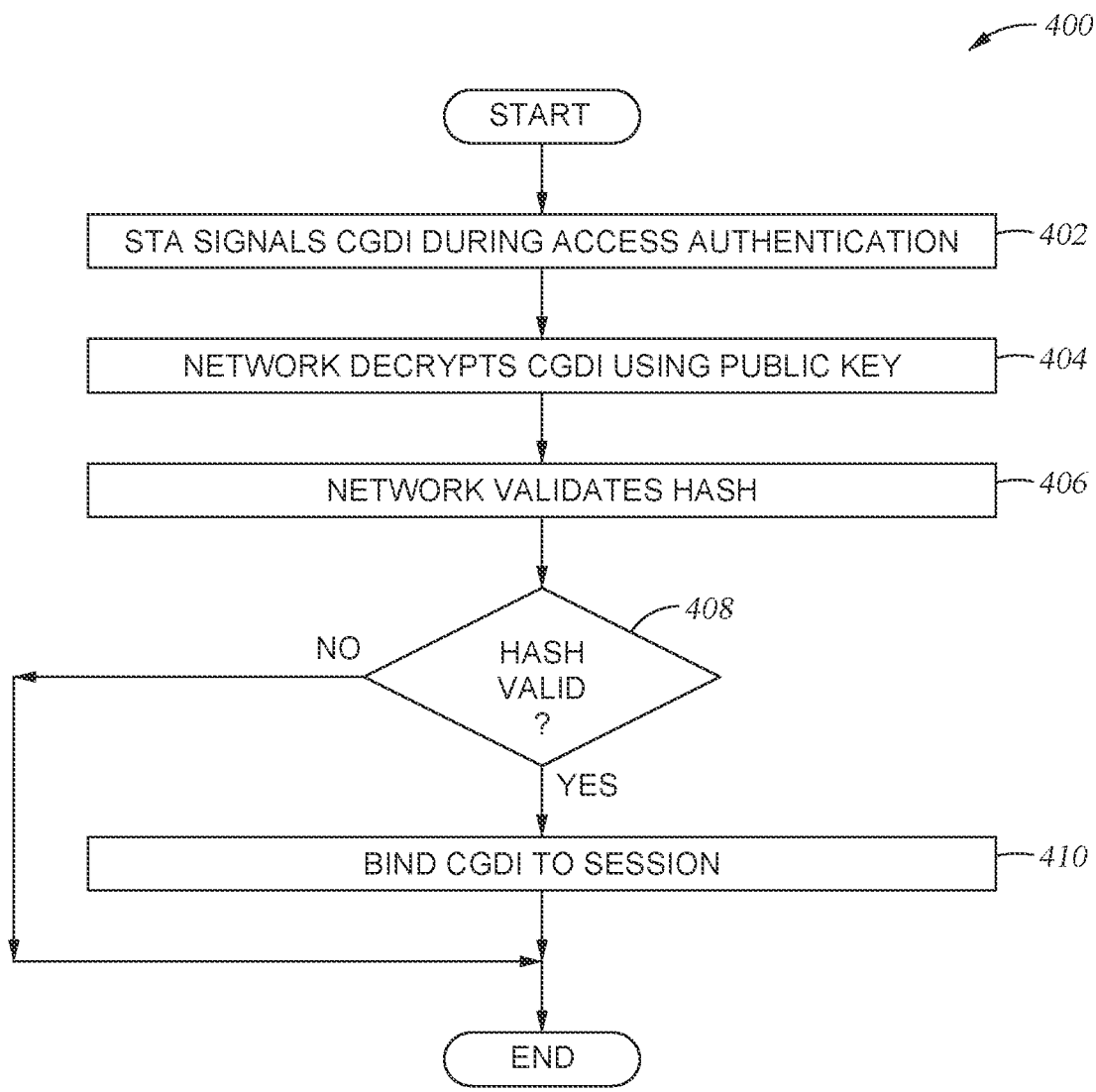
FIG. 4 is a flowchart illustrating validating cryptographically generated device identifiers, according to one embodiment.

FIG. 4 is a flowchart 400 illustrating validating cryptographically generated device identifiers, according to one embodiment. In an embodiment, a CGDI is generated for an STA using the techniques discussed above in relation to FIG. 3. FIG. 4 describes one example for validating this CGDI.

At block 402, a CGDI service (e.g., the CGDI service 212 illustrated in FIG. 2) at an STA signals the CGDI during access authentication. For example, an STA attached to an access network matching the network identifier associated with the CGDI (e.g., a network identifier used to generate a one-way hash, as discussed above in relation to block 304 illustrated in FIG. 3) can signal the CGDI as part of access authentication procedures. Alternatively, or in addition, the STA can signal the CGDI using link-layer protocol options. This is merely an example, and any suitable technique can be used. Further, in an embodiment, the STA signals the public key and any auxiliary parameters used for hash computation.

At block 404, a CGDI service (e.g., the CGDI service 262 illustrated in FIG. 2) at a controller, wireless access point (AP), or another network device, decrypts the CGDI using the public key. For example, the STA can signal the public key to the network, along with the CGDI. The network device can then use the public key to decrypt the CGDI and re-create the hash.

At block 406, the CGDI service at the network validates the hash. In an embodiment, the network device re-creates the one-way hash using its access network identifier, the public key, and the auxiliary parameters provided by the STA. The network device then compares this re-created hash with the decrypted hash generated at block 404, to validate the hash.

At block 408, the CGDI service at the network determines whether the hash is valid. If the hash is valid (e.g., the generated hash matches the decrypted hash), the flow proceeds to block 410. If not, the flow ends.

At block 410, the CGDI service at the network binds the CGDI to the session. For example, the CGDI service can bind the CGDI to the session associated with the STA and tie the CGDI to the session state in a AAA function (e.g., the AAA 122 illustrated in FIG. 1A). The CGDI will then remain a stable device identifier, in the access network, for the STA. In an embodiment, if the STA initiates a second connection to the access network using a different radio access technology, the CGDI will be validated again and the associated sessions are correlated (e.g., at the AAA function).

Figure 5:
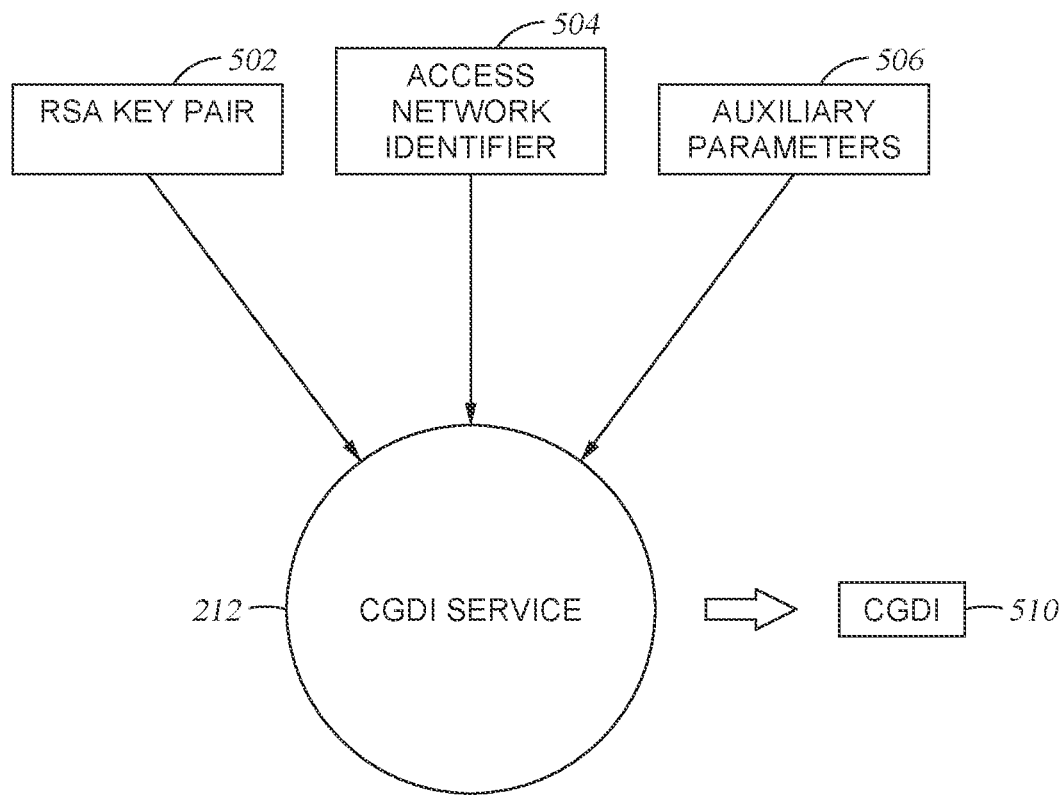
FIG. 5 illustrates generating a cryptographic device identifier, according to one embodiment.

FIG. 5 illustrates generating a cryptographic device identifier, according to one embodiment. As discussed above in relation to block 304 illustrated in FIG. 3, in an embodiment a CGDI service (e.g., the CGDI service 212 at an STA) generates a one-way hash. The CGDI service can use a public key from an RSA key pair 502, an access network identifier 504, and any auxiliary parameters 506.

As discussed above in relation to block 304 illustrated in FIG. 3, the access network identifier 504 can be a private enterprise identifier, a PLMN identifier, an NID, an NAI realm (e.g., xxx.mnc[MNC].mcc[MCC].3gppnetwork.org), an SSID, an RCOI, or any other suitable identifier. These are merely examples, and any suitable access network identifier 504 can be used.

Further, in an embodiment, the auxiliary parameters 506 can include elements from the authentication procedure. This can include an NAI, a key (e.g., a key generated during network onboarding for the STA), or any other suitable parameter.

The CGDI service 212 generates the one-way hash using the inputs 502-506. The CGDI service 212 then encrypts the one-way hash using a private key from the RSA key pair 502. This encrypted hash serves as the CGDI 510. For example, the CGDI service 212 can generate a 64-bit identifier which can be used as a CGDI for the access network used to generate the hash. For example, the CGDI can be bound to the access network using a AAA function (e.g., the AAA 122 illustrated in FIG. 1A). This is merely an example. In an embodiment, an enterprise user with multiple devices will generate a unique CGDI for each device and on an access network basis.

Furthermore, while FIG. 5 focuses on the STA generating the CGDI, this is merely an example. Alternatively, or in addition, a network (e.g., the access network 120 illustrated in FIG. 1A), policy function (e.g., the AAA 122 illustrated in FIG. 1A) or IDP (e.g., the IDPs 182 and 184 illustrated in FIG. 1B) can also generate the device identifier and provision the corresponding private/public key parameters on the STA.

Figure 6:
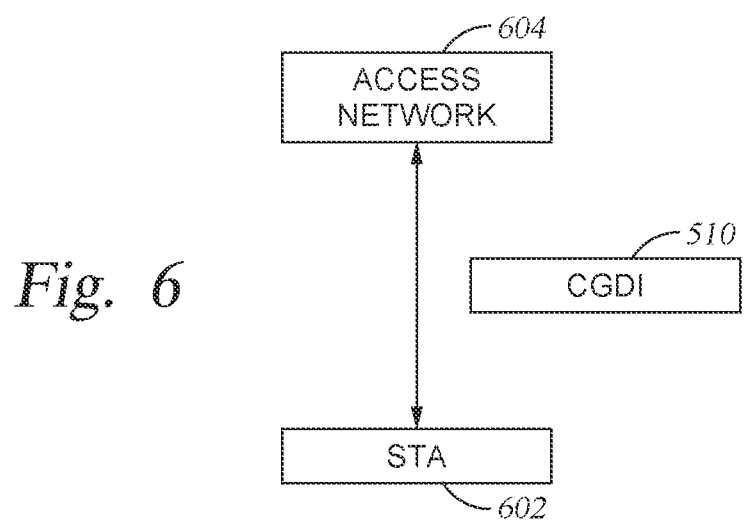
FIG. 6 illustrates use of a cryptographic device identifier, according to one embodiment.

FIG. 6 illustrates use of a cryptographic device identifier, according to one embodiment. An STA 602 uses a CGDI 510 (e.g., generated using the techniques discussed above in relation to FIG. 5) as an identifier for an access network 604. As discussed above, in an embodiment the CGDI 510 binds to a given access network, and acts as a unique identifier for the STA 602 for the access network 604.

Further, the CGDI 510 is unique to the STA 602 because the STA 602 can assert ownership over the CGDI 510, and the CGDI 510 is immutable within the access network 604. The CGDI is access-agnostic and can be signaled over any radio access technologies associated with the access network 604 (e.g., both cellular and WiFi radio access technologies, or any other suitable radio access technologies).

As discussed above in relation to FIG. 4, in an embodiment the CGDI 510 can be signaled to the access network 604 as part access authentication, link layer procedures, or using any other suitable technique. The access network 604 (e.g., a controller, AP, or any other suitable component relating to the access network 604) decrypts the CGDI 510 (e.g., using a public key associated with the STA 602), and validates the CGDI 510 by comparing a hash value from the decrypted CGDI with a generated hash value.

If the CGDI 510 is valid, the access network 604 binds the CGDI 510 to a session. For example, the access network 604 can bind the CGDI 510 to the session associated with the STA 602 and tie the CGDI 510 to the session state in a AAA function (e.g., the AAA 122 illustrated in FIG. 1A). The CGDI 510 will then remain a stable device identifier, in the access network 604, for the STA 510.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving, from a wireless station (STA) and by a network device of an access network, a cryptographically generated device identifier (CGDI) and a public key relating to the STA;
decrypting, by the network device, the CGDI using the public key to produce a first hash;
generating, by the network device, a second hash by hashing an identifier of the access network and the public key;
determining, by the network device, that the first hash matches the second hash; and
based on determining that the first hash matches the second hash, identifying the STA in the access network using the CGDI based on binding the CGDI to a session associated with the STA and the access network.

2. The method of claim 1, wherein the CGDI uniquely identifies the STA for the access network.

3. The method of claim 1, further comprising:
receiving one or more auxiliary parameters relating to the STA, wherein generating the second hash further uses the auxiliary parameters.

4. The method of claim 1, comprising:
receiving a second CGDI relating to the STA; and
validating the second CGDI for the STA and a second access network,
wherein the second CGDI is different from the CGDI, and
wherein the second CGDI identifies the STA in the second access network.

5. The method of claim 1, wherein the CGDI is received at the access network using a WiFi radio access technology.

6. The method of claim 5, further comprising:
receiving the CGDI at the access network a second time using a cellular radio access technology,
wherein the CGDI is successfully validated for the access network after being received over both the cellular radio access technology and the WiFi radio access technology.

7. The method of claim 1, wherein the CGDI is generated at the STA based on encrypting a one-way hash using a private key associated with the STA.

8. The method of claim 7, wherein the STA generates the one-way hash based on an identifier for the access network and the public key.

9. A system, comprising:
a processor; and
a memory having instructions stored thereon which, when executed on the processor, performs operations comprising:
receiving, from a wireless station (STA), a cryptographically generated device identifier (CGDI) and a public key relating to the STA;
decrypting the CGDI using the public key to produce a first hash;
generating a second hash by hashing an identifier of an access network and the public key;
determining that the first hash matches the second hash; and
based on determining that the first hash matches the second hash, identifying the STA in the access network using the CGDI based on binding the CGDI to a session associated with the STA and the access network.

10. The system of claim 9, wherein the CGDI uniquely identifies the STA for the access network.

11. The system of claim 9, the operations further comprising:
receiving one or more auxiliary parameters relating to the STA, wherein generating the second hash further uses the auxiliary parameters.

12. The system of claim 9, wherein the CGDI is received at the access network using a WiFi radio access technology.

13. The system of claim 12, the operations further comprising:
receiving the CGDI at the access network a second time using a cellular radio access technology,
wherein the CGDI is successfully validated for the access network after being received over both the cellular radio access technology and the WiFi radio access technology.

14. A non-transitory computer-readable medium having instructions stored thereon which, when executed by a processor, performs operations comprising:
receiving, from a wireless station (STA), a cryptographically generated device identifier (CGDI) and a public key relating to the STA;
decrypting the CGDI using the public key to produce a first hash;
generating a second hash by hashing an identifier of an access network and the public key;
determining that the first hash matches the second hash; and
based on determining that the first hash matches the second hash, identifying the STA in the access network using the CGDI based on binding the CGDI to a session associated with the STA and the access network.

15. The non-transitory computer-readable medium of claim 14, wherein the CGDI uniquely identifies the STA for the access network.

16. The non-transitory computer-readable medium of claim 14, the operations further comprising:

receiving one or more auxiliary parameters relating to the STA, wherein generating the second hash further uses the auxiliary parameters.

17. The non-transitory computer-readable medium of claim 14, wherein the CGDI is received at the access network using a WiFi radio access technology, the operations further comprising:
   receiving the CGDI at the access network a second time using a cellular radio access technology,
   wherein the CGDI is successfully validated for the access network after being received over both the cellular radio access technology and the WiFi radio access technology.

\* \* \* \* \*